United States Patent
Le Gall

[15] 3,665,283
[45] May 23, 1972

[54] PLURAL AXES GYRO-MOTOR LIGHT-BEAM TARGET TRACKING FACILITY

[72] Inventor: Jean Claude Le Gall, Rue des Bruyeres La Clante Ploumanach, Perros-Guirec, France

[22] Filed: June 18, 1970

[21] Appl. No.: 47,327

[30] Foreign Application Priority Data

June 20, 1969 France....................................6920826

[52] U.S. Cl............................................318/649, 318/640
[51] Int. Cl..........................................................B64c 17/06
[58] Field of Search...................................318/649, 648, 640

[56] References Cited

UNITED STATES PATENTS

| | | | |
|---|---|---|---|
| 2,989,672 | 6/1961 | Agins | 318/649 |
| 3,395,270 | 7/1968 | Speller | 318/649 |

Primary Examiner—T. E. Lynch
Attorney—Abraham A. Saffitz

[57] ABSTRACT

Light-beam target tracking facility comprising a stationary base, a source emitting a light beam lying on said base and an arrangement including two gyroscopes, a bearing gyroscope and an elevation gyroscope, used as motors and having intersecting and rectangular precession axes. Each gyroscope comprises a precession outer gimbal, a nutation inner gimbal, a rotor and a torque motor connected to its nutation inner gimbal. The precession outer gimbal of the bearing gyroscope bears a frame rigidly connected thereto and the precession outer gimbal of the elevation gyroscope is rotatable around said frame and bears a principal mirror rigidly connected thereto. The precession shaft of the bearing gyroscope is hollow and conveys the light beam. At the intersection of the precession axes of the two gyroscopes, another mirror deviates the light beam along the direction of the precession axis of the elevation gyroscope. Then the light beam falls on to the principal mirror which has a plane 45° apart from the plane of the precession outer gimbal of the elevation gyroscope and the beam is rejected perpendicularly to said outer gimbal plane.

5 Claims, 9 Drawing Figures

INVENTOR:
Jean-Claude LE GALL

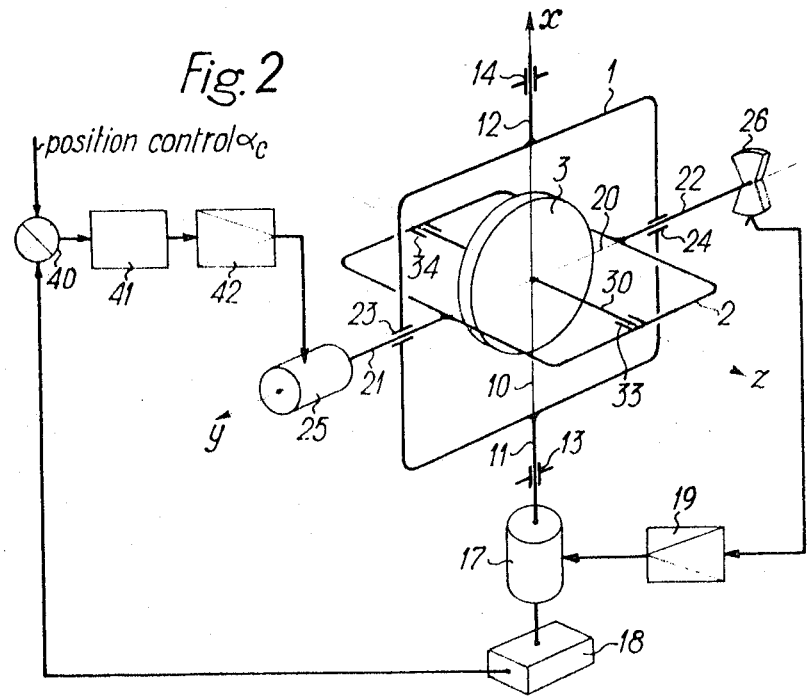
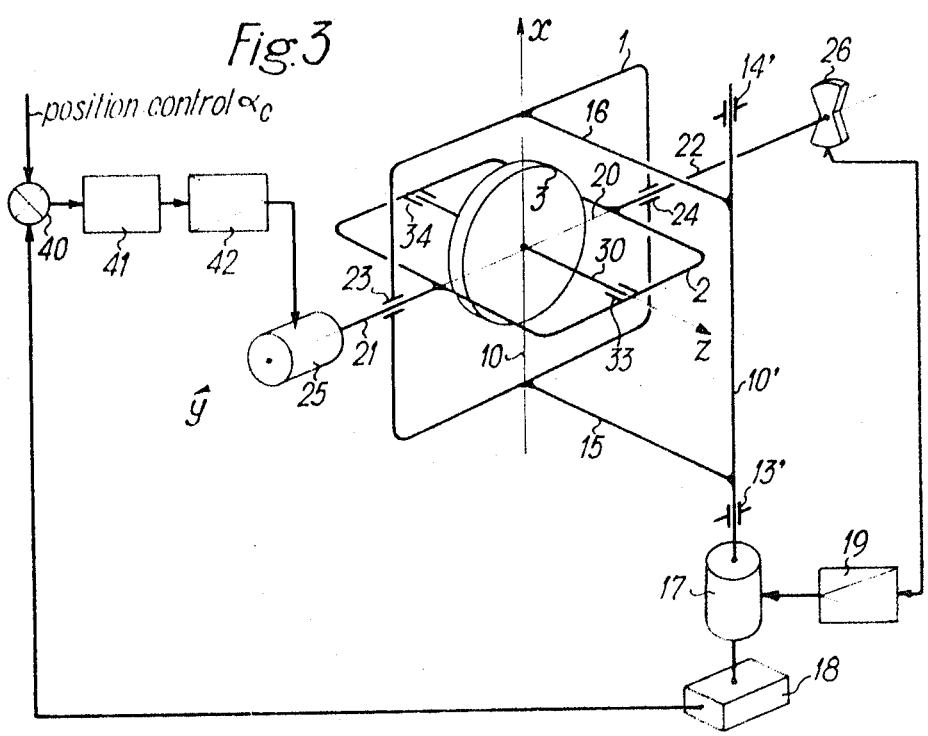

Patented May 23, 1972

INVENTOR:
Jean-Claude LE GALL
By Abraham A. Saffitz
ATTORNEY

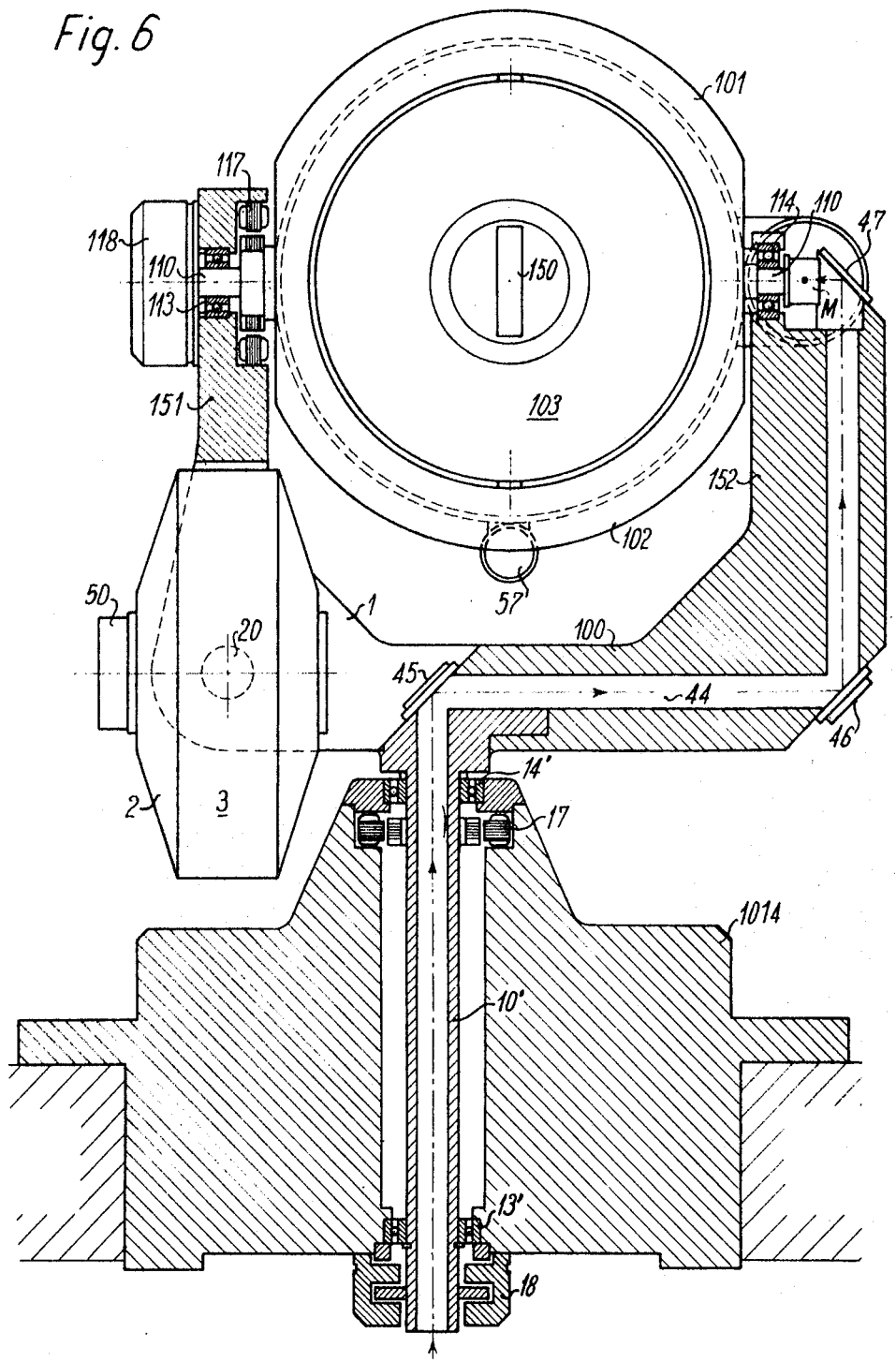

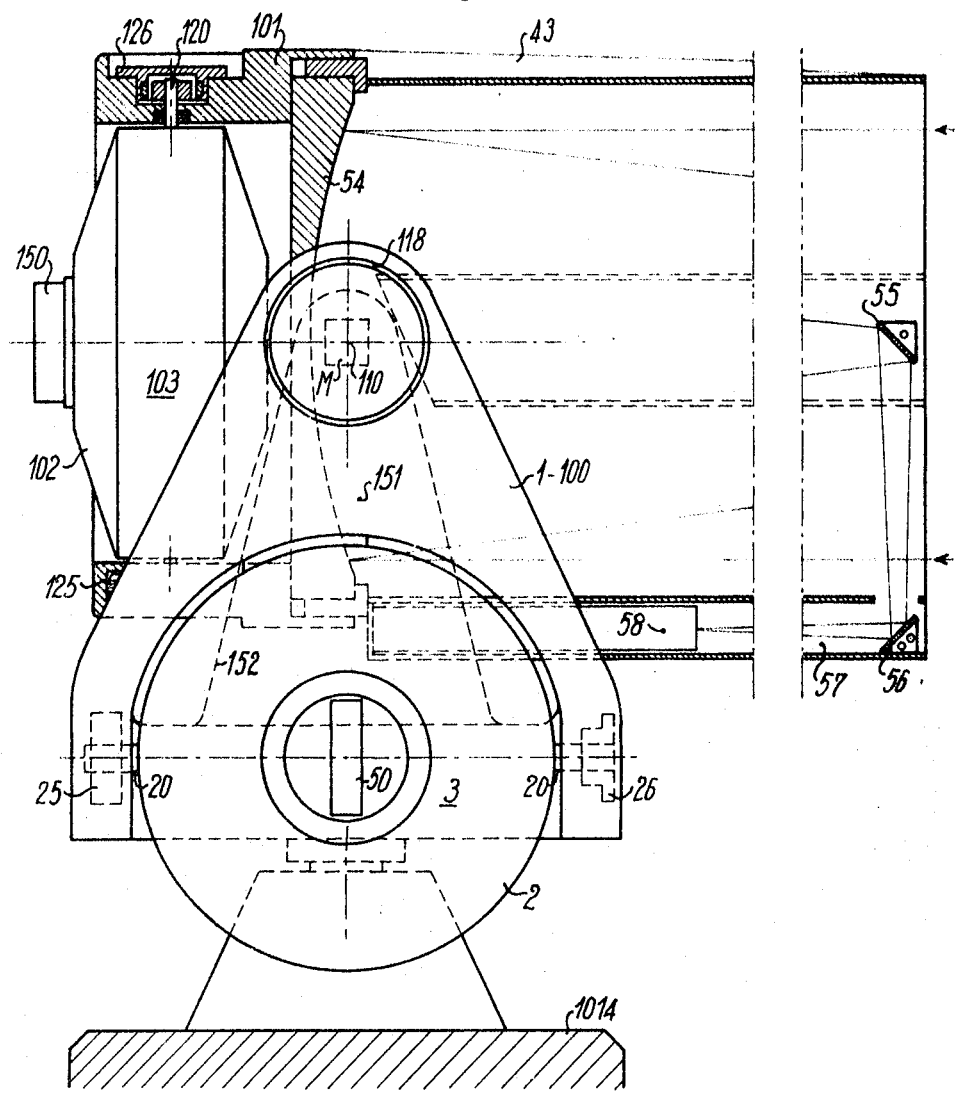

PLURAL AXES GYRO-MOTOR LIGHT-BEAM TARGET TRACKING FACILITY

This invention relates to a target tracking facility using a pulsating or continuous coherent light beam from a laser, more particularly a tracking system in which gyroscopes are used, not as direction detectors as usual but as servomotors. In other words the external gimbal of the gyroscope carries the load to be oriented.

A gyroscope used as motor develops little mechanical power and so the use of servomechanisms having gyroscopes as motors is limited. However, it has been found that servomechanisms of this kind are very useful for some problems such as determining the paths of satellites and ballistic missiles, space telecommunications, topographical surveys of the moon's surface and telemetric and geodesic measurements. To solve problems of this kind, of course, high-precision equipment is essential because so many factors must be considered, such as random refraction phenomena, which are due to the fluctuating heterogeneous medium forming the atmosphere and which bend the light rays of incident and reflected beams, random atmospheric variations, such as variations in wind pressure, direction and speed, which disturb the strength of the light beams, target speed variations, and the very narrow lobe presented by the radiation pattern of a laser.

In the prior art servomechanisms using various kinds of motors, for instance, electric and hydraulic motors, the mechanical power can be transmitted to some elements via speed reducers which can convert the motor speed variation ranges or adapt the motor outputs to the mechanical impedances of the members coupled with the motors. Unfortunately, speed reducers transmit speeds modulated by faults in the tooth systems forming the gearing, introduce extra phase shifts because of mechanical backlash, still have threshold speeds and therefore introduce positional errors, and are the source of vibratory phenomena similar to those occurring in tuned and coupled circuits, since the various gear-wheels used in the reducers are not always rigid enough.

A light-beam type satellite tracking facility must be able to rotate at speeds of from a few tenths of a degree per hour or even less up to from 2° to 3° per second, otherwise there may be positional errors. The prior-art servomechanism motors cannot provide this range of speed variation and have a pulsating form of operation at low speeds, with tolerance as regards the controlled position of the tracking facility.

In the drive gyroscope type servomechanisms according to the invention, speed reducers, and with them their disadvantages, can be obviated. Also, the precessing speed of a gyroscope is very regular and is free from jerks over a very wide range of variation. A drive gyroscope has no threshold speed. Another advantage of the invention is that the aiming position is unaffected by disturbing external torques such as wind. As will be seen hereinafter, the nature of such torques may produce a special movement known as nutation, but considerable damping thereof is possible and so nutation is a minor disadvantage. Another advantage of the invention is that the control frequency can be very high.

A first gyroscope-type motor serves for bearing control, and for elevation control the horizontal top of a table rotated by the bearing gyroscope bears a second gyroscope-type motor called the elevation gyroscope, the same being so disposed on the table that its gyroscope torque has only minor effects on the bearing speed. The bearing gyroscope and the elevation gyroscope are each associated with two torque motors, one for correcting inner-gimbal drift and the other for applying to the outer-gimbal spindle a control torque for moving a mirror secured appropriately to the free end of the outer-gimbal spindle or shaft. As will be seen hereinafter, if the mirror is placed appropriately, the light beam from a stationary laser can be directed towards the mirror center to produce a reflected beam whose direction depends upon the control signals applied to the input terminals of the torque motors of the bearing and elevation gyroscopes.

The coherent light-beam-type target-tracking facility is placed at a ground station and is adapted to follow a satellite in all directions in a hemisphere.

Tracking of this kind requires a servomechanism comprising a mounting of a type depending upon the inclination of the orbit to the equator and upon the latitude of the ground station. There are of course two main kinds of mounting for these cases, namely the "bearing-elevation" mounting for use in association with satellites whose orbital plane is at a very reduced inclination to the equatorial plane, the ground station being at a latitude greater than such inclination, and the "equatorial" type of mounting for use in association with orbits at a very reduced inclination to the equator, the ground station being disposed at a low latitude. The tracking facility according to the invention to be described hereinafter comprises a bearing-elevation type mounting.

The invention will be better understood from the following detailed description, reference being made to the accompanying drawings wherein:

FIG. 2 is a simplified and conventional view of a facility having a single drive gyroscope and adapted to provide a single positional control;

FIG. 3 shows the facility of FIG. 2, with the rotational axis of the outer gimbal not passing through the center of gravity of the drive gyroscope;

FIGS. 6 and 7 are views in front and side elevation respectively of an exemplary embodiment of the invention.

Figure 1:
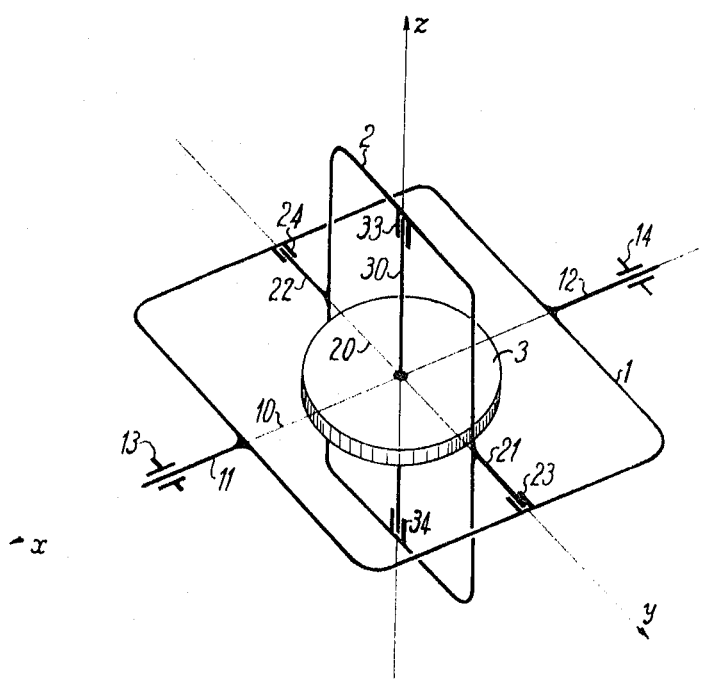
FIG. 1 is a simplified view of a conventional gyroscope having 2° of freedom.

The conventional gyroscope shown in FIG. 1 and having 2° of freedom comprises an outer gimbal 1 rotatable around two pivots 11, 12 running in two stationary bearings 13, 14 and defining an axis $Ox$, an inner gimbal 2 rotating around two pivots 21, 22 running in two bearings 23, 24 disposed on gimbal 1 and defining an axis $Oy$ perpendicular to the axis $Ox$, and a discoid wheel 3 having a spin axis 30 running in two bearings 33, 34, spin axis 30 defining an axis $Oz$ perpendicular to the axis $Oy$.

If I is the moment of inertia of the wheel relatively to the axis $Oz$, $\omega$ denotes the speed of wheel rotation (around the axis $Oz$) and $\Omega$ denotes the precessing speed (around the axis $Ox$), the gyroscopic torque $\Gamma$ is of course given by the formula:
$$\Gamma = I \omega \Omega$$

FIG. 2 is a view in simplified and diagrammatic form of a facility having a single drive gyroscope and providing a single positional control. The main item of the facility shown in FIG. 2 is a gyroscope which has 2° of liberty and is of the kind shown in FIG. 1 and whose pivots 21, 22 define the rotational axis 20 of the inner gimbal 2 which has a torque motor 25 adapted to output a mechanical torque proportional to its input control current. If internal friction in the gyroscope is negligible, application of the torque produced by the torque motor 25 rotates the gyroscope around the precession axis 10 but leaves gimbal 2 in its position. Unfortunately, a gyroscope always has residual friction which manifest as interfering torques causing gimbal 2 to rotate.

To obviate this disadvantage, axis 10 of gimbal 1 is coupled with the shaft of a torque motor 17 serving to cancel out the effect of such interfering torques. Motor 17 therefore operates only if friction moves gimbal 2 out of its horizontal position. The shifts of gimbal 2 from its horizontal position are measured by a conventional deviation detector 26 secured to one end of axis 20 of gimbal 2. The signals from detector 26 are applied to the terminals of torque motor 17 after amplification by an amplifier 19. All the interfering torques applied to shaft 10 are cancelled, thus eliminating the "speed threshold."

For positional control, axis 10 has at one end a conventional kind of angular encoder 18, the same outputting a signal whose instantaneous value depends upon the instantaneous angular position $\alpha_t$ of axis 10. The signal goes to one of the pairs of terminals of a conventional comparator 40 whose other pair of terminals receive a signal defining the required angular position $\alpha_c$ of gimbal 1; the comparator 40 outputs an error signal $\epsilon$ proportional to the difference ($\alpha_c - \alpha_t$) which a digital-to-analog converter 41 converts into an analog voltage, such voltage then being amplified by amplifier 42 and then operating the torque motor 25, which rotates axis 10 until the disappearance of the error signal $\epsilon$.

Before a description is given of a facility having drive gyroscopes and adapted to provide two positional controls according to the invention, the following comments about the single positional control facility of FIG. 2 are in order.

FIG. 3 shows a facility which is similar to the one shown in FIG. 2 but in which the rotational axis or shaft 10' of gimbal 1 does not pass through the center of gravity of the drive gyroscope but is eccentric. Through the agency of adequately rigid uprights 15, 16 perpendicular to the plane of gimbal 1 and welded to the new axis 10' parallel to the former spindle or axis 10, gimbal 1 rotates around spindle or axis 10'. Since the new axis 10', is parallel to the axis of symmetry $Ox$ and is disposed in the plane of symmetry $xOz$, the torque applied to gimbal 1 retains the same value in relation to the axis 10', with the result that the gyroscope system rotates around the axis 10' in the same conditions as hereinbefore described with reference to axis 10.

Figure 4:
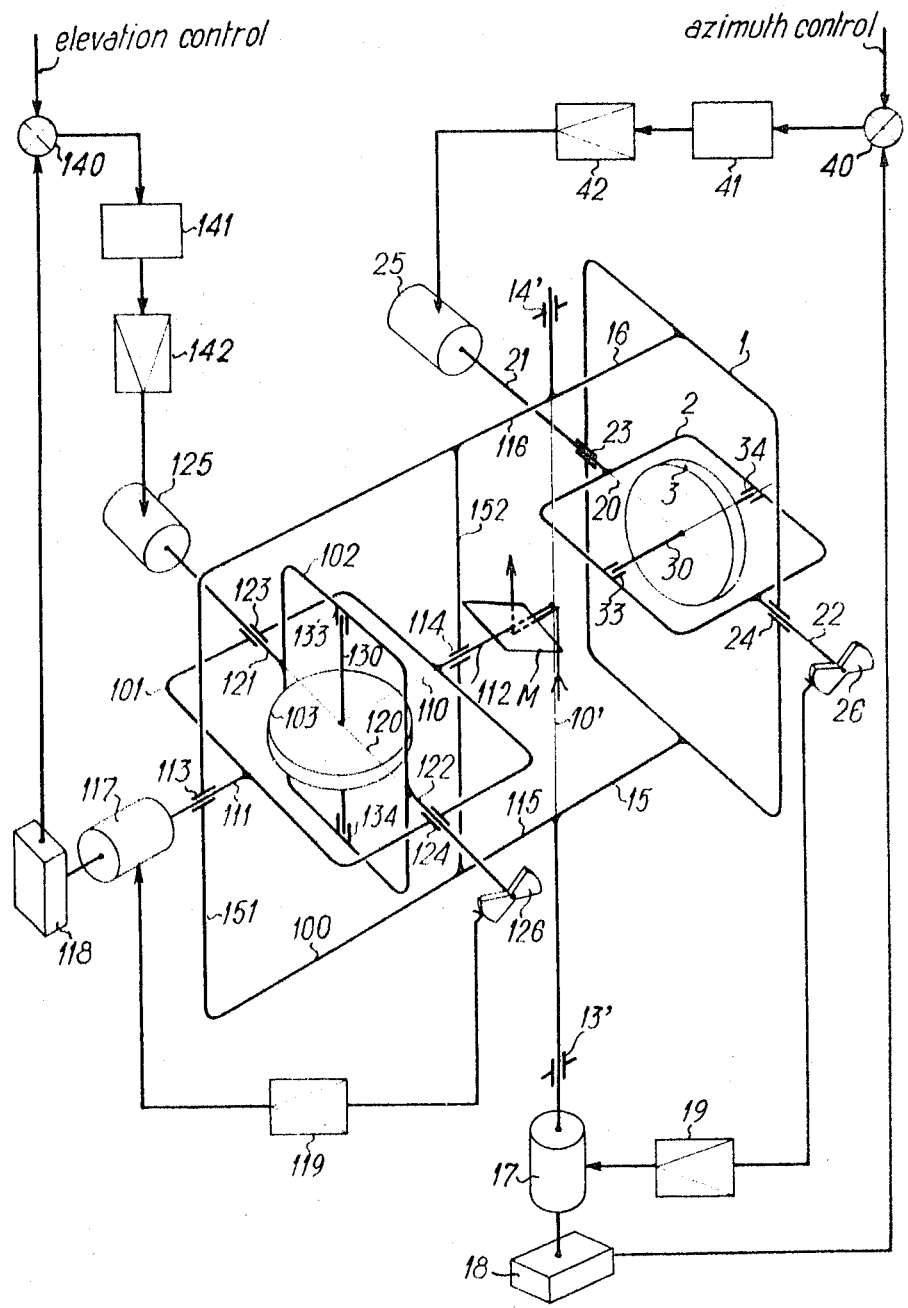
FIG. 4 is a simplified view of a facility having two drive gyroscope-motors according to the invention and adapted to provide two positional controls.

FIG. 4 is a simplified and diagrammatic view of a facility according to the invention having two drive gyroscopes and adapted to provide two positional controls. Gyroscopes 3, 103 used in the light beam type target tracking facility described hereinafter will hereinafter be called the "bearing gyroscope" and the "elevation gyroscope" respectively. The bearing gyroscope 3 is of the kind shown in FIG. 3 and the elevation gyroscope 103 is of the kind shown in FIG. 2. Gimbal 1 of gyroscope 3 is eccentric of axis 10', which does not pass through the center of wheel 3. On the other hand, axis 110 of gyroscope 103 passes through the center of wheel 103. Elements in gyroscope 103 which are the same as in gyroscope 3 have the same reference numerals as in the latter plus 100.

As FIG. 4 shows, gyroscope 103 is mounted in a frame 100, having two longitudinal arms 15-115 and 16-116 and two transverse arms 151 and 152, solid with gimbal 1 and rotating around the precession axis 10' of gyroscope 3. The outer gimbal 101 of gyroscope 103 is borne with respect to frame 100 by pivots 111 and 112 rotating in bearings 113 and 114 borne by the transverse arms 151 and 152 of frame 100. Pivots 111 and 112 define a precession axis 110. The extension of axis 110 passes through the center of the wheel of gyroscope 3.

As will be seen hereinafter, the center of a mirror is placed at a position M where the shafts 10' and 110 intersect one another. This mirror is the load to be oriented by the gyroscope motor and it is rigidly connected to the precession shaft of the elevation gyroscope. The mirror, since it is rigidly secured to shaft 110, rotates therewith when the torque motor 125 receives an elevation position order, such elevation being the required elevation for the light beam reflected by the mirror to reach the target being tracked.

A light beam type target tracking facility according to the invention will now be described.

Figure 5:
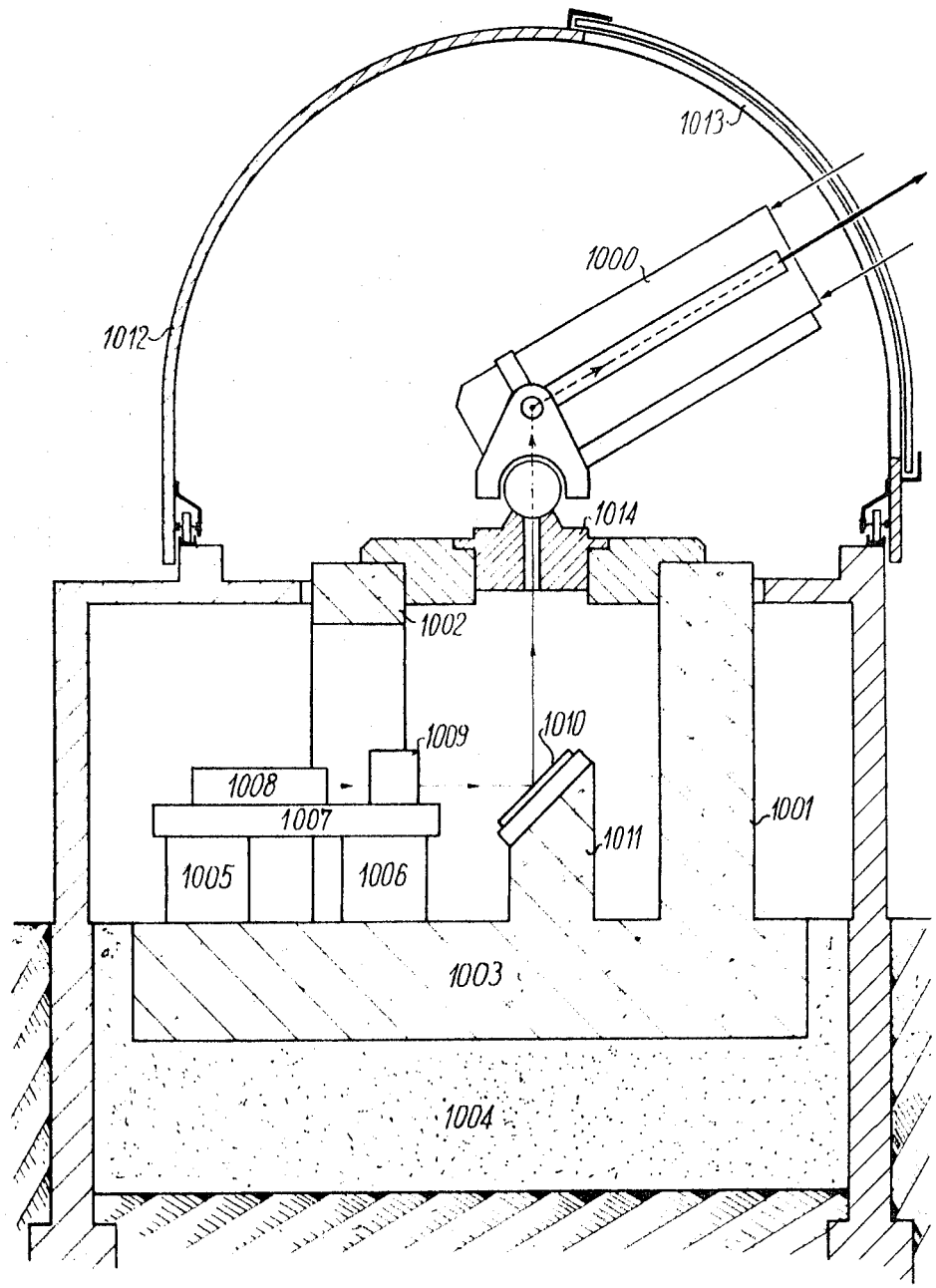
FIG. 5 shows a satellite tracking station comprising the facility according to the invention.

FIG. 5 shows a satellite tracking station comprising the facility according to the invention. As can be seen, the premises housing the station are devised for maximum damping of vibration originating in the ground. Accordingly, the tracking facility 1000 is disposed on concrete uprights 1001, 1002 rigidly secured to a concrete foundation 1003 embedded in sand 1004. Resting on foundation 1003 is a very heavy table whose legs are two concrete blocks 1005, 1006 and whose top 1007 is a block of e.g. polished granite.

A laser 1008 and associated optical equipment 1009 are placed on table top 1007. The radiation is transmitted from laser 1008 to the tracking facility 1000 by a plane mirror 1010 borne by a concrete upright 1011 rigidly secured to foundation 1003. The tracking facility 1000 is protected from atmosphere by a radome 1012 having a window 1013 closed by a transparent part-spherical member. The rotation of radome 1012 is servo-controlled by means (not shown) so as to be synchronous with the rotation of the facility 1000 according to the invention.

FIGS. 6 and 7 are views in front elevation and side elevation respectively of the tracking facility. There can be seen the bearing gyroscope 3 and elevation gyroscope 103 of FIG. 4. Their wheel cannot be seen since they are enclosed in appropriate casings forming the inner gimbals 2, 102 of the gyroscopes 3, 103 respectively. The outer gimbal of bearing gyroscope 3 is a metal fork 1 which is shown in side elevation in FIG. 7 and in section in FIG. 6 and which forms part of upright 151 of gimbal 100 (FIG. 4) bearing gyroscope 103. Parts of FIGS. 6 and 7 on the one hand and parts of FIG. 4 having the same function are given the same reference numerals. Shaft 20 of inner gimbal 2 is borne by the two tines of the fork 1, one tine receiving the torque motor 25 and the other tine receiving the angular deviation detector 26, both shown in broken lines in FIG. 7. Visible in FIG. 6 is the horizontal shaft 10' which bears the two gyroscopes 3, 103 with the interposition of the combined member 1, 100 which is both the outer gimbal of gyroscope 3 and the support for the outer gimbal 101 of gyroscope 103. Shaft 10' extends through frame 1014 (FIGS. 5 and 6) which maintains shaft 10' vertical by way of bearings 13', 14'. As in FIG. 4, torque motor 17 and encoder 18 are disposed on shaft 10'. Thus it can be seen that all the elevation gyroscope structure is carried about by the outer gimbal 1 of gyroscope 3.

The outer gimbal 101 of the elevation gyroscope 103 takes the form of a metal annulus 101 in which, as can be seen in FIG. 7, a metal cylinder 43 engages; as will be seen hereinafter, cylinder 43 is used to collect the light reflected from the target when the same is picked up by the light beam from laser 1008 (FIG. 5). The system formed by the members 101, 43 is mounted on a shaft 110 which is simply the pivot for outer gimbal 101 of gyroscope 103. Pivot or shaft 110 is borne by uprights 151, 152 of frame 100; as previously described, upright 151 is bifurcated to form the outer gimbal 1. Thus it can be seen that the orientable transmit and receive structure is carried about by the outer gimbal 101 of gyroscope 103.

That part of pivot 110 which is mounted in bearing 114 secured to the end of upright 152 carries a mirror M whose plane always remains at 45° to the plane of the outer gimbal 101 of the elevation gyroscope 103, as can be seen in FIG. 6. That part of shaft 110 which is borne by bearing 113 secured to the top end of upright 151 is rigidly secured to the torque motor 117 and to the angular encoder 118, as can be seen in FIG. 6.

The sectional view in FIG. 7 of the outer gimbal 101 of gyroscope 103 shows how the shaft 120 of inner gimbal 102 of gyroscope 103 has at the top an angular decoder 126 and at the bottom the torque motor 125.

Referring to FIG. 6, a passage 44 extends through shaft 10', the base of frame 100 and the upright 152; via passage 44 the light beam output by laser 1008 and reflected by mirror 1010 reaches mirror M. Accordingly, passage 44 has, at each change of incident beam direction, mirrors 45–47 inclined to enable the beam to reflect on mirror M. The back, and not the reflecting surface, of the mirror is visible in FIG. 6.

Secured to the inner gimbals 2, 102 are two miniature rate-gyros 50, 150 which serve to damp nutation movements caused by disturbing external torques. What impairs the response time of a gyroscope is of course the inertia of its universal mountings; consequently, when a disturbing torque is produced, the gyroscope responds not by a variation of precessing speed but by an appreciable tilt which is then associated with the gyroscope precessing movement, the gyroscope then oscillating simultaenously around the axes of rotation of its inner and outer gimbals. These two oscillatory movements are coupled together and not independent.

When the nutation movements appear, the rate-gyros 50, 150 produce signals whose amplitudes are proportional to the amplitudes of the nutation movements and which, if introduced, appropriately into the feedback channels of the gyroscopes 3, 103 can provide considerable damping of the nutation movements.

Rate-gyros are of course familiar devices which are merely gyroscopes having just one freedom — i.e., just one gimbal — which is biased by a spring return force and by a viscous damping torque. The angular displacement $\beta$ of the rate-gyro gimbal around its rotational axis (output shaft or axis) is proportional to the angular speed $\Omega$ at which the two bearings of the gimbal are moving around the gimbal axis (input axis or shaft). The pendulum system formed by a rate-gyro is heavily damped, and so equilibrium is reached rapidly and we can write:

$$\beta = (I\omega)\,\Omega/K = H\,\Omega/K,$$

H denoting the rate-gyro's own kinetic moment (see formula (1) hereof) and K denoting the stiffness of the restoring spring. The measured value of angle $\beta$ is converted into an electrical signal by an angle detector (for instance, a voltage divider), whose rotational axis coincides with the rotational axis of the rate-gyro gimbal.

Figure 8A:
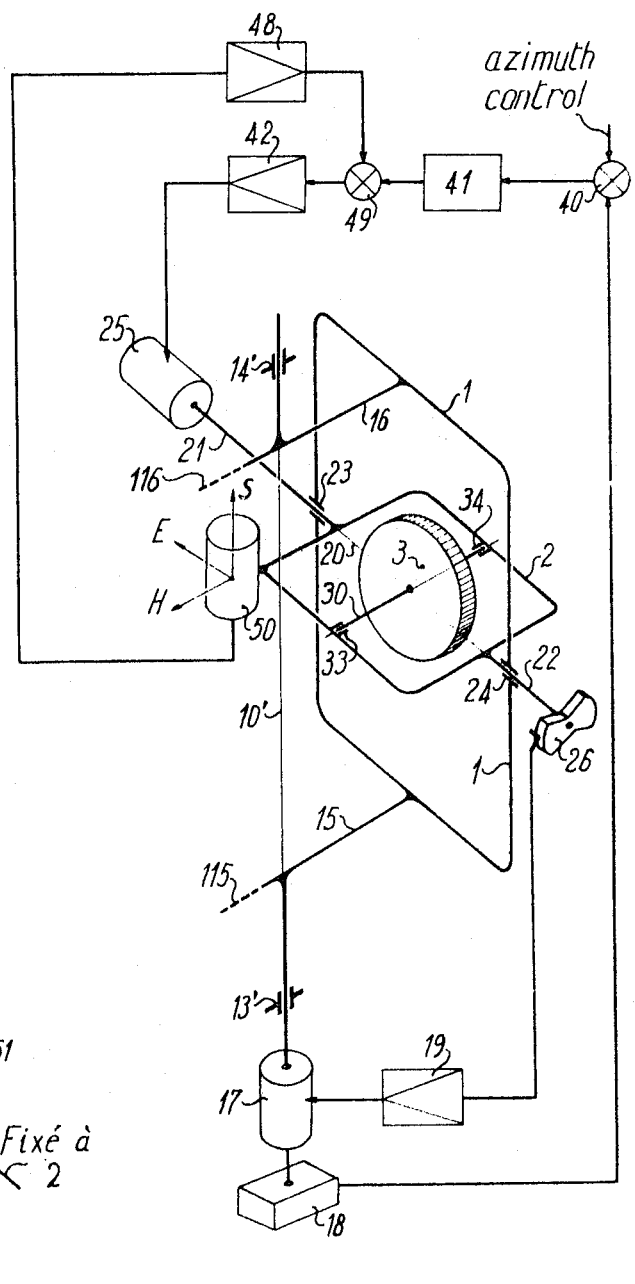
FIGS. 8a and 8b show the bearing gyroscope of the facility of FIG. 4 associated with a nutation-damping rate-gyro.
Figure 8B:
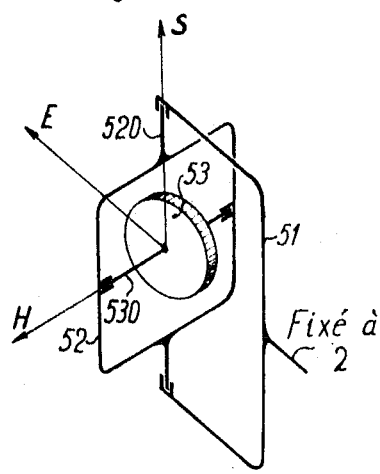

FIG. 8a shows the bearing gyroscope 3 (previously shown in FIG. 4) whose inner gimbal 2 has the rate-gyro 50, and FIG. 8b shows the orientations of the constituent parts of rate-gyro 50 relatively to the constituent parts of the bearing gyroscope 3. The planes of the two wheels 3, 53 and their spin axes 30, 530 are parallel but the rotational shafts 20, 520 of the two gimbals 2, 52 are perpendicular to one another. The support member 51 for the bearings of the shaft 520 of gimbal 52 is rigidly secured to inner gimbal 2 of bearing gyroscope 3. The signal from rate-gyro 50 is introduced into the feedback line of torque motor 25 of bearing gyroscope 3 via an amplifier 48 and a comparator 49 which is disposed in the channel between the digital-to-analog converter 41 and the amplifier 42.

A description will now be given of the facility for collecting target-reflected light. As already stated, the collecting tube 43 is secured to outer gimbal 101 (FIG. 7), and mirror M is mounted on shaft 110 of gimbal 101. Tube 43 therefore rotates with mirror M and so is aimed automatically at the target when the same has been picked up by the incident light beam transmitted towards the target by mirror M. The base of tube 43 is received in gimbal 101 and takes the form of a spherical mirror 54 reflecting incident light to the 45° mirror 55 disposed on the axis of tube 43 at the center of the aperture therein. Mirror 55 reflects the light thus received to a second 45° mirror 56 disposed in a tube 57 secured to tube 43 along a generatrix thereof and comprising a device 58 which forms part of the optical and electronic equipment and which serves to process the information supplied by the light reflected from the target.

In order to keep FIGS. 6 and 7 clear, a facility according to the invention is shown as having gyroscopes with anti-friction bearings. Instead of such gyroscopes, gyroscopes having compressed-air bearings can of course be used, in which event the sensitivity of the facility according to the invention is increased appreciably.

What I claim is:

1. A light-beam type target tracking facility comprising a stationary base, a bearing and motor gyroscope having a precession outer gimbal rotatable with respect to said base and defining a bearing precession axis, a nutation inner gimbal rotatable with respect to said precession outer gimbal about a bearing nutation axis perpendicular to said bearing precession axis and a wheel rotatable with respect to said nutation inner gimbal about a spin axis perpendicular to said bearing nutation axis, a support member rigidly secured to the precession outer gimbal of said bearing gyroscope, an elevation and motor gyroscope having a precession outer gimbal rotatable with respect to said support member and defining an elevation precession axis, a nutation inner gimbal rotatable with respect to said precession outer gimbal about an elevation nutation axis perpendicular to said elevation precession axis and a wheel rotatable with respect to said nutation inner gimbal about a spin axis perpendicular to said elevation nutation axis, a light source, an optical member rigidly secured to said elevation precession outer gimbal, receiving from said light source said light-beam coincident successively with said bearing precession axis direction and said elevation precession axis direction and reflecting said light-beam along a direction perpendicular to said elevation gyroscope precession outer gimbal, bearing and elevation torque motors respectively secured to said bearing and elevation nutation inner gimbals and means for applying respectively bearing and elevation input signals to said torque motors.

2. A light-beam type target tracking facility as set forth in claim 1 in which the bearing and elevation gyroscopes comprise an angular position detector secured to the nutation axes of said gyroscopes and producing a nutation signal, a torque motor secured to the precession axes of said gyroscopes and means for respectively applying said nutation signals to said torque motors.

3. A light-beam type target tracking facility comprising a stationary base, a bearing and motor gyroscope having a precession outer gimbal rotatable with respect to said base and defining a bearing precession axis, a nutation inner gimbal rotatable with respect to said precession outer gimbal about a bearing nutation axis perpendicular to said bearing precession axis and a wheel rotatable with respect to said nutation inner gimbal about a spin axis perpendicular to said bearing nutation axis, a support member rigidly secured to the precession outer gimbal of said bearing gyroscope, an elevation and motor gyroscope having a precession outer gimbal rotatable with respect to said support member and defining an elevation precession axis, a nutation inner gimbal rotatable with respect to said precession outer gimbal about an elevation nutation axis perpendicular to said elevation precession axis and a wheel rotatable with respect to said nutation inner gimbal about a spin axis perpendicular to said elevation nutation axis, a light source, an optical member secured to said elevation precession outer gimbal, receiving said light-beam coincident successively with said bearing precession axis direction and said elevation precession axis direction and reflecting said light-beam along a direction perpendicular to said elevation gyroscope precession outer gimbal, angular position detectors secured to the precession outer gimbals of said bearing and elevation gyroscopes and respectively producing an actual bearing signal and an actual elevation signal, bearing and elevation torque motors respectively secured to said bearing and elevation gyroscope nutation inner gimbals, means for applying to said tracking facility bearing and elevation input signals, a bearing circuit for subtracting said actual bearing signal from said input bearing signal and forming a bearing difference signal, said bearing difference signal being applied to the bearing torque motor, and an elevation circuit for subtracting said actual elevation signal from said input elevation signal and forming an elevation difference signal, said elevation difference signal being applied to the elevation torque motor.

4. A light-beam type target tracking facility as set forth in claim 3 in which the bearing and elevation gyroscopes are secured to one-freedom-degree gyros having wheels rotatable around spin axes respectively parallel to the spin axes of the wheels of said bearing and elevation gyroscopes, said one-freedom-degree gyros producing output bearing and elevation signals and means are provided for subtracting said output bearing and elevation signals from respectively said bearing difference signal and said elevation difference signal.

5. A light-beam type target tracking facility as set forth in claim 1 in which said light source is a laser source.

* * * * *